United States Patent
Duffau et al.

(10) Patent No.: US 12,168,380 B2
(45) Date of Patent: Dec. 17, 2024

(54) REAR AXLE FOR A MOTOR VEHICLE, OF THE TYPE WITH TWO LONGITUDINAL TRAILING ARMS HAVING IMPROVED ELASTIC BEHAVIOUR

(71) Applicant: RENAULT S.A.S., Boulogne Billancourt (FR)

(72) Inventors: Benjamin Duffau, Guyancourt (FR); Jean-Pierre Millon, Guyancourt (FR); Remi Rollet, Gif (FR)

(73) Assignee: RENAULT S.A.S., Boulogne Billancourt (FR)

( * ) Notice: Subject to any disclaimer, the term of this patent is extended or adjusted under 35 U.S.C. 154(b) by 0 days.

(21) Appl. No.: 18/566,416

(22) PCT Filed: May 24, 2022

(86) PCT No.: PCT/EP2022/064075
§ 371 (c)(1),
(2) Date: Dec. 1, 2023

(87) PCT Pub. No.: WO2022/253640
PCT Pub. Date: Dec. 8, 2022

(65) Prior Publication Data
US 2024/0246379 A1     Jul. 25, 2024

(30) Foreign Application Priority Data
Jun. 4, 2021    (FR) ...................... 2105880

(51) Int. Cl.
*B60G 3/14*        (2006.01)
*B60G 21/05*       (2006.01)

(52) U.S. Cl.
CPC ........... *B60G 3/145* (2013.01); *B60G 21/051* (2013.01); *B60G 2200/1322* (2013.01);
(Continued)

(58) Field of Classification Search
CPC . B60G 3/225; B60G 3/12; B60G 3/14; B60G 21/05; B60G 7/02; B60G 2204/422;
(Continued)

(56) References Cited

U.S. PATENT DOCUMENTS 4,039,205 A     8/1977   Castanier

FOREIGN PATENT DOCUMENTS

| DE | 1505697 A1 * | 8/1970 | ............. B60G 21/05 |
| DE | 40 21 157 A1 | 2/1991 | |

(Continued)

OTHER PUBLICATIONS

International Search Report Issued Sep. 9, 2022, in PCT/EP2022/064075, filed on May 24, 2022, 2 pages.
(Continued)

*Primary Examiner* — Paul N Dickson
*Assistant Examiner* — Matthew D Lee
(74) *Attorney, Agent, or Firm* — Oblon, McClelland, Maier & Neustadt, L.L.P.

(57) ABSTRACT

A motor vehicle rear axle is of the type having two longitudinal trailing arms. Each trailing arm has a stub-axle bracket at one rear end and, at an opposite front end, a substantially transverse axis of rotation defined by a first joint and a second joint which are intended to be connected to the vehicle body. A first and a second support element are located respectively in front of and behind a trailing arm on the side of its second joint. The free ends of these support elements, located in the longitudinal and vertical median plane of the rear axle, are kept at a longitudinally fixed distance by a connecting element.

15 Claims, 4 Drawing Sheets

(52) U.S. Cl.
CPC .... *B60G 2200/46* (2013.01); *B60G 2204/421* (2013.01); *B60G 2204/422* (2013.01)

(58) Field of Classification Search
CPC .......... B60G 2204/421; B60G 2200/46; B60G 2200/1322; B60G 21/051; B60G 3/145
See application file for complete search history.

(56) References Cited

FOREIGN PATENT DOCUMENTS

| EP | 4094960 A1 * | 11/2022 | ........... B60G 21/051 |
|----|---|---|---|
| FR | 1451022 A * | 6/1966 | ............. B60G 21/05 |
| FR | 2 296 541 A1 | 7/1976 | |
| GB | 2464939 A * | 5/2010 | ........... B60G 21/052 |
| WO | WO-2024099761 A1 * | 5/2024 | ............. B60G 21/05 |

OTHER PUBLICATIONS

Preliminary French Search Report dated Jan. 31, 2022 in French Patent Application No. 2105880 (with English Translation of Category of Cited Documents), 3 pages.

* cited by examiner

REAR AXLE FOR A MOTOR VEHICLE, OF THE TYPE WITH TWO LONGITUDINAL TRAILING ARMS HAVING IMPROVED ELASTIC BEHAVIOUR

The invention relates to a rear suspension for a motor vehicle, of the type having two longitudinal trailing arms, particularly to a rear suspension with improved elastic behavior and notably increased induced understeer effect.

Motor vehicle rear suspensions with two trailing arms each connected to the body of the vehicle by two elastic articulations, the ends of the trailing arms opposite those articulated to the body carrying the rear wheels of the vehicle, have been known for many years. The wheels of this type of rear suspension are therefore independent.

Figure 1:
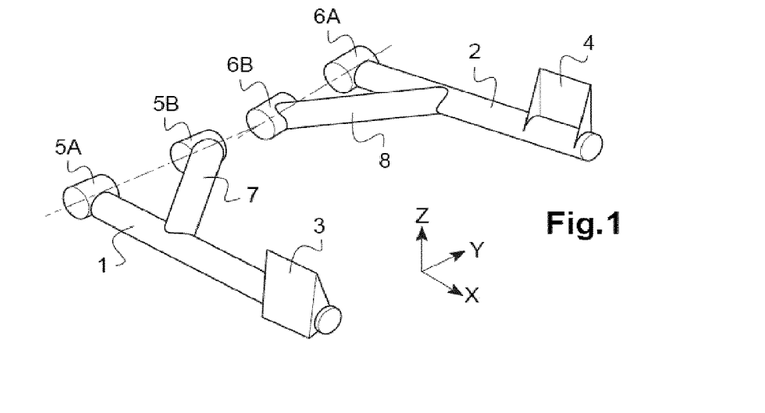
FIG. 1 is a schematic perspective depiction of a rear suspension according to the prior art.
Figure 2:
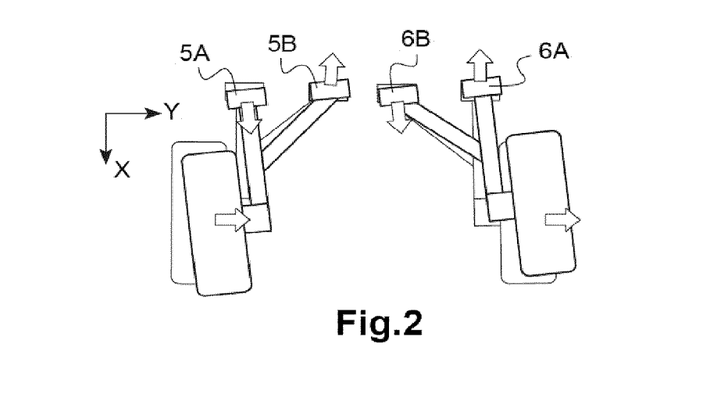
FIG. 2 is a schematic depiction, viewed from above, of the rear suspension of FIG. 1 in a situation before (wheels straight) and after (wheels angled) cornering to the right.

This type of rear suspension is depicted in FIG. 1. Each of the two trailing arms 1, 2 has a stub-axle carrier 3, 4 at its rear end and is connected to the body by two elastic articulations of substantially transverse axis, one of the elastic articulations 5A, 6A being situated at the front end of the trailing arm 1, 2, the other elastic articulation 5B, 6B being situated at the front end of an oblique arm 7, 8 secured to the respective trailing arm 1, 2, the elastic articulations 5B, 6B being situated transversely between the articulations 5A, 6A. In this type of rear suspension, the axes of the articulations 5A, 5B, on the one hand, and 6A, 6B on the other hand, intersect in the longitudinal and vertical (transversely) mid-plane of the vehicle. These axes may be transverse or make a non-zero angle with respect to the transverse direction of the vehicle. Furthermore, the articulations 5B, 6B are generally situated above the articulations 5A, 6A vertically and to the rear of these articulations along the longitudinal axis of the vehicle. FIG. 2 depicts the behavior of this type of rear suspension when cornering to the right: it is found that, under a transverse load, the articulations 5B, 6B deform elastically, one being offset toward the front and the other toward the rear in the longitudinal direction, leading to oversteer, which is undesirable.

In order to keep the articulations 5B, 6B in position longitudinally under cornering, one known solution is to make the arms pivot relative to one another in a transverse direction, notably using a torsion bar. To do this, each front end of a trailing arm is secured to a transverse strut directed toward the front end of the other trailing arm, the transverse struts being pivotably mounted one relative to the other about a transverse axis and in a transversely median position. However, this type of rear suspension is fairly flexible at its center because the central articulation is not connected to the body. Furthermore, for reasons of space, it is difficult to modify this type of structure in order to create significant induced understeer effects.

There is therefore still a need for a rear suspension with trailing arms of the aforementioned type that exhibits improved elastic behavior and preferably that induces an understeer effect.

To this end, the invention relates to a motor vehicle rear suspension of the type having two longitudinal trailing arms, wherein each trailing arm has a stub-axle carrier at a rear end and, at an opposite front end, a substantially transverse axis of rotation defined by a first articulation and a second articulation which are intended to be connected to the body of the vehicle. The second articulations are situated transversely between the first articulations, and the axes of rotation of the trailing arms are secant at a point of intersection belonging to a longitudinal and vertical (transversely) mid-plane of the rear suspension. According to the invention:

one of the trailing arms is secured, at its second articulation, to a first support element extending toward the front of the suspension, the other trailing arm is secured, at its second articulation, to a second support element extending toward the rear of the suspension, free ends of the first and second support elements are situated in the longitudinal and vertical midplane of the rear suspension and are connected to one another and held at a fixed distance apart in a substantially longitudinal direction by a connecting element that is pivotably mounted about at least one transverse axis at least at one of the free ends of the first and second support elements.

This configuration allows longitudinal transmission of the loads experienced by the second articulations. Furthermore, by maintaining a longitudinally fixed distance between the second articulations, under cornering, the movements of the second articulations in longitudinally opposite directions are prevented by the connecting element, improving the guidance of the wheels under transversal load and the elastic behavior of the rear suspension.

The connecting element is pivotably mounted about at least one transverse axis at least at one of the free ends of the first and second support elements or at both of the free ends, and may be pivotably mounted about at least one other axis, for example about a longitudinal axis and about a vertical axis.

Advantageously, the fixed distance separating the free ends of the first and second support elements may be comprised within an interval ranging from zero to a threshold value. This threshold value may be determined by calculation according to the desired behavior for the rear suspension.

Advantageously, the connecting element may extend vertically above the point of intersection of the axes of rotation of the trailing arms, notably at a non-zero distance less than or equal to a threshold value and typically determined with the vehicle unladen when the rear suspension is mounted on the vehicle. This configuration offers the advantage of inducing understeer in the rear suspension.

The threshold value may be determined on the basis of the characteristics of the rear suspension and more specifically of the articulations.

The connecting element is preferably a mechanical connecting element, notably one without any hydraulic component, which is simple to produce.

In one embodiment, the connecting element may be an elongate component having two ends that are distant in the longitudinal direction, each of these ends being pivotably mounted at one of the free ends of the first and second support elements about at least one transverse axis of rotation. In this embodiment, the distance between the free ends of the first and second support elements is therefore non-zero. This distance will advantageously be chosen to be as short as possible; the minimum distance may for example be dictated by the dimensions of the articulations, which are themselves dimensioned according to the mechanical characteristics of the rear suspension and/or may be dictated by assembly constraints.

This elongate component may take the form of a simple plate, generally flat, typically made of metal. The thickness and/or the material may notably be chosen so that the component withstands the longitudinal loads applied when the vehicle is in motion, notably cornering.

Typically, the elongate component may extend in a horizontal or substantially horizontal plane, parallel or substantially parallel to a horizontal plane containing the point of intersection of the axes of rotation of the trailing arms.

The ends of the elongate component may be articulated to the free ends of the first and second support elements by articulations having at least one transverse axis of rotation. Articulations of the ball joint type may notably be used.

In another embodiment, the connecting element may be an articulation having at least one transverse axis of rotation, advantageously an elastic articulation.

In this embodiment, the distance between the free ends of the first and second support elements is therefore zero.

Whatever the embodiment, a removable, optionally adjustable, notably in the longitudinal direction, fixing system may be provided for connecting at least one support element to the connecting element, this being to make the trailing arms easier to produce and to assemble.

A fixing system may notably comprise a first fixing element secured to a trailing arm near the second articulation thereof or a support element, a second fixing element secured to an anchoring element of the connecting element, the first and second fixing elements each being pierced with two corresponding orifices accepting fixings of the screw-nut type, optionally at least one orifice having a larger dimension than the orifice with which it collaborates, notably in an adjustment direction, The first and second fixing elements may notably form part of a support element and/or may form the support element. The anchoring element for the connecting element will for example be configured to accept an articulation of the ball joint type or an elastic articulation.

A fixing system may also comprise a first fixing element secured to a trailing arm near the second articulation thereof or a support element, a second fixing element secured to an anchoring element of the connecting element, the first fixing element having a threaded orifice, the second fixing element having a threaded rod extending parallel to the longitudinal direction and engaging with the threaded orifice. The anchoring element may notably be secured to one of the ends of the threaded rod. The threaded rod may be held in position by one or two nuts, preferably two.

Each of these two variants may be used for one or both support elements. Advantageously, the first fixing element may be positioned, with respect to the support element or to the trailing arm, outside of a zone in which a second articulation is mounted and/or in which the trailing arm is machined.

The invention finally relates to a vehicle equipped with a rear suspension according to the invention.

The invention will now be described with reference to the nonlimiting examples and appended drawings, in which.

Substantially horizontal, longitudinal, transverse or vertical is understood to mean a direction/plane forming an angle of at most ±20°, or at most ±10° or at most ±5° with a horizontal, longitudinal, transverse or vertical direction/plane.

Figure 3:
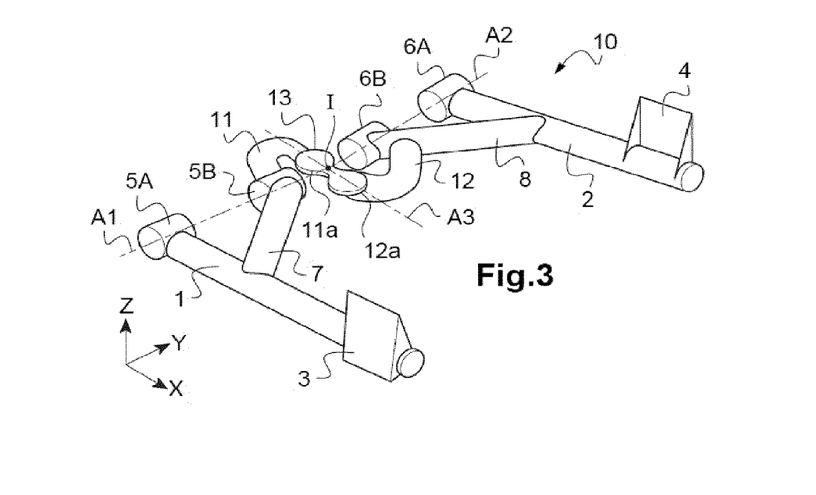
FIG. 3 is a schematic perspective depiction of a rear suspension according to one embodiment of the invention.
Figure 4:
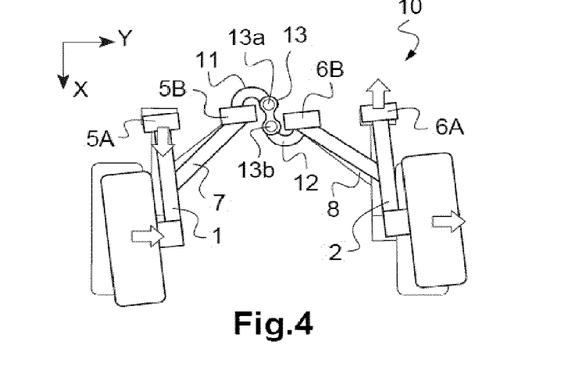
FIG. 4 is a schematic depiction, viewed from above, of the rear suspension of FIG. 3 in a situation before (wheels straight) and after (wheels angled) cornering to the right.

FIGS. 3 and 4 depict a motor vehicle rear suspension 10 according to one embodiment of the invention. This rear suspension 10 comprises two longitudinal trailing arms 1, 2. Each trailing arm 1, 2 has a stub-axle carrier 3, 4 at a rear end. At an opposite, front, end, each trailing arm 1, 2 has a substantially transverse axis of rotation A1, A2 defined by a first articulation 5A, 6A and a second articulation 5B, 6B, respectively, these being intended to be connected to the body of the vehicle. The axes of rotation A1, A2 of the trailing arms may each make, with the transverse direction, an angle ranging from 0 to 15°. When they make a non-zero angle with the transverse direction, each of the axes of rotation A1, A2 is then inclined toward the rear of the rear suspension, as depicted in the figures.

The second articulations 5B, 6B are situated transversely between the first articulations 5A, 6A.

In the embodiment depicted, each second articulation 5B, 6B is secured to a respective oblique arm 7, 8, each oblique arm extending from one of the trailing arms 1, 2 to which it is secured, in an oblique direction toward the other trailing arm and toward the front of the rear suspension. Each free front end of an oblique arm 7, 8 thus bears a respective second articulation 5B, 6B. However, the invention is not restricted to a specific form of the trailing arms, it being possible for example for these to take the form of a solid component, with no empty space between the oblique arms and the rest of the trailing arms.

Typically, the second articulations 5B, 6B are situated above the first articulations 5A, 6A vertically and possibly to the rear of these articulations along the longitudinal axis of the vehicle.

The first and second articulations are generally elastic articulations, also known as "bushings" or "silent blocs". This type of articulation, which is well known, typically comprises two coaxial tubes rotationally mounted relative to one another and separated by a block of polymer material. An elastic articulation is usually mounted inside a bush, the outer tube being secured to this bush. In the figures, only the bushes accepting the elastic articulations 5A, 6A, 5B, 6B and secured to the trailing arms 1, 2 or oblique arms 7, 8 are visible. The inner tubes of the elastic articulations are themselves secured to the body of the vehicle.

Each of the trailing arms 1, 2 may thus pivot about an axis of rotation A1, A2 that is defined by the two articulations 5A, 5B or, respectively, 6A, 6B, that connect it to the body of the vehicle. These axes of rotation A1, A2 are secant at a point of intersection I belonging to the longitudinal and vertical midplane of the rear suspension. This plane is a transversely mid-plane of the rear suspension extending in the longitudinal and vertical directions.

According to the invention, one of the trailing arms 1 is secured at its second articulation 5B to a first support element 11 extending toward the front of the rear suspension, and the other trailing arm 2 is secured at its second articulation 6B to a second support element 12 extending toward the rear of the suspension. These support elements 11, 12 here take the form of a curved arm although the invention is not restricted by the shape of the support elements. Furthermore, the free ends 11a, 12a of these first and second support elements 11, 12 are situated in the longitudinal and vertical midplane of the rear suspension and are connected to one another and held at a fixed distance apart in the longitudinal direction by a connecting element 13 that is notably able to transmit loads in a substantially longitudinal direction X.

In the example depicted in FIGS. 3 and 4, this connecting element 13 is an elongate component, also known as a tie, each end of which is rotationally mounted on one of the free ends 11a, 12a of the support elements 11, 12, via an articulation 13a, 13b. Each articulation 13a, 13b has at least one transverse axis of rotation. In the example, this tie 13 takes the form of a simple flat plate, typically made of steel or of aluminum. The axis A3 connecting the articulations 13a, 13b of the tie 13 furthermore extends substantially parallel to the longitudinal direction of the rear suspension, in the vertical and longitudinal midplane of the rear suspension.

The distance, which is non-zero, separating the articulations 13a, 13b may be chosen to be less than or equal to a threshold value. This threshold value may be determined by calculation and correspond for example to a maximum acceptable level of deformation of the rear suspension. By way of example, this distance may be from 30 to 70 mm, preferably 35 to 60, or any interval defined by two of these limits. This distance will preferably be the shortest possible distance, a minimum distance being dictated by the dimensions of the articulations 13a, 13b, for example ball joints and/or by constraints on mounting the second articulations 5B, 6B and/or by constraints on the machining of the trailing arms.

As depicted here, the articulations 13a, 13b are situated symmetrically on each side of the point of intersection I in the longitudinal direction. However, the invention is not restricted to this arrangement and an asymmetric positioning of the articulations 13a, 13b is entirely conceivable.

In the example depicted in FIGS. 3 and 4, the axis A3 intersects the axes of rotation A1 and A2 of the arms at the point of intersection I. In a variant, this axis A3 could be situated vertically above the point I (still in the vertical and longitudinal midplane of the rear suspension), notably at a non-zero distance less than or equal to a threshold value. Such a raised position of the connecting element 13 makes it possible to improve the induced understeer effect, as shown in the examples. The threshold value may be determined by calculation depending on the maximum longitudinal travel permitted by the second articulations 5B, 6B. By way of example, the vertical position of the axis A3 of the connecting element with respect to the point of intersection I may range from 0 to 35 mm, advantageously from 0 to 30 mm, from 5 to 25 mm or from 10 to 20 mm, or any interval defined by two of these limits.

As shown by the arrows in FIG. 4, the presence of the connecting element 13 makes it possible longitudinally to constrain the relative position of the second articulations 5B, 6B when cornering to the right: the arms 1 and 2 and the wheels that they carry experience less variation in oversteering toe-in by comparison with the variation in toe-in seen in FIG. 2 in the absence of a connecting element.

Figure 5:
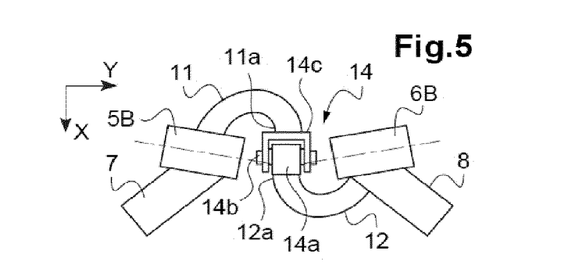
FIG. 5 is a schematic depiction, viewed from above, of the connecting element according to another embodiment.

In the example depicted in FIG. 5, the free ends 11a, 12a of the first and second support elements 11, 12 are connected by an articulation 14, in this instance an elastic articulation, which will allow longitudinal loads to be transmitted. In the example, this elastic articulation 14 is inserted inside a bush 14a, secured to the free end 12a of the second support element. The axis of rotation 14b of the elastic articulation is itself fixed to a yoke 14c secured to the free end 11a of the other support element 11. Nevertheless, the positions of the yoke and of the bush could be reversed. In the example depicted, the axis 14b of the articulation 14 is parallel to the transverse direction Y.

In this embodiment, the articulation 14 is thus situated at the point of intersection I of the axes of rotation of the trailing arms.

As in the other embodiment described with reference to FIGS. 3 and 4, the articulation 14 may be situated at the point of intersection I of the axes of rotation A1, A2 of the trailing arms 1, 2 or else may be situated vertically above this point of intersection. Similarly, by way of example, the vertical position of the connecting element 14 with respect to the point of intersection I may thus range from 0 to 35 mm, advantageously from 0 to 15 mm or lie in any interval defined by two of these limits.

It will be noted that the behavior of the rear suspension equipped with this central articulation 14 is similar to the behavior of the rear suspension fitted with a tie 13, and described with reference to FIG. 4.

The position of the support elements 11, 12 near the second articulations 5B, 6B may make it difficult to create the bush to accept these articulations and to fit them as well as making adjustment operations, for example adjusting the wheel alignment, difficult. It may then be advantageous to provide a removable fixing system connecting the support elements and the connecting element. This fixing system will preferably be adjustable, notably in the longitudinal direction. For example a longitudinal adjustment of +/−6 mm may be provided.

In general, a fixing system may comprise at least two fixing elements, one of which is secured to the support element or to the trailing arm (near its second articulation) and the other of which is secured to an anchoring element of the connecting element. These fixing elements may form all or part of the support element. Typically, one of the fixing elements at least is arranged so that, prior to assembly, it does not impede an operation of fitting a second articulation and/or of manufacturing the trailing arm. In other words, this fixing element is not positioned inside a zone in which this second articulation is mounted and/or in which the trailing arm is manufactured. Such a zone Z is indicated by way of example in FIG. 9.

Examples of fixing systems are described with reference to FIGS. 6 to 9.

Figure 6:
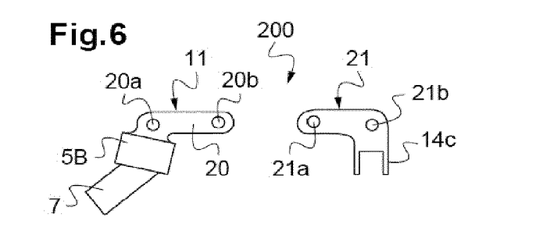
FIG. 6 is a view from above, of a fixing system for a connecting element according to one embodiment.

FIG. 6 depicts a fixing system 200 comprising a first fixing tab 20 pierced with two orifices 20a, 20b, forming part of a support element 11 and a second fixing tab 21, likewise pierced with two orifices 21a, 21b and bearing an anchoring element of the yoke type 14c to accept the axis 14b of the articulation 14 depicted in FIG. 5. This second fixing tab 21 forms another part of a support element 11. The first fixing tab 20 extends outside of a zone in which the second articulation 5B is mounted and/or in which the trailing arm is manufactured. The orifices in the two fixing tabs 20 and 21 align when superposed, allowing them to be assembled using screw/nut systems. It will be noted that, in place of the yoke 14c, the second fixing tab 21 could, by way of anchoring element, have the bush 14a or else an orifice to accept an articulation of the tie depicted in FIG. 3. Whatever the embodiment, one of the orifices of one of the fixing tabs may have an oblong shape so as to allow adjustment, notably in the longitudinal direction. In this embodiment, the support element 11 is thus formed of the assembly of the fixing tabs 20, 21.

Figure 7:
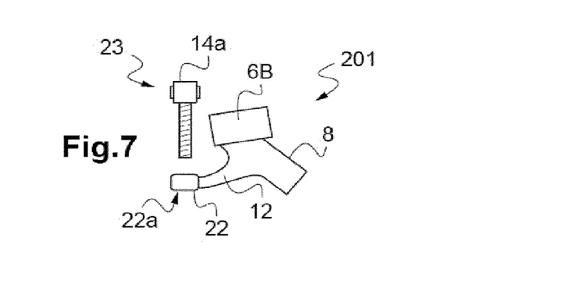
FIG. 7 is a view from above, of a fixing system for a connecting element according to another embodiment.

FIG. 7 depicts a fixing system 201 comprising a ring 22 having a threaded orifice 22a and a threaded rod 23 extending in the longitudinal direction and one end of which is secured to the bush 14a of the articulation 14 of FIG. 5, this bush forming an anchoring element. The threaded rod 23 thus allows the position of the bush 14a to be adjusted relative to the ring 22 and therefore relative to the support element. The ring 22 is fixed to the free end of the support element 12 outside of a zone in which the second articulation 6B is mounted and/or in which the trailing arm is manufactured. In a variant, the threaded rod 23 could be secured to the yoke 14c by way of anchoring element.

Figure 8:
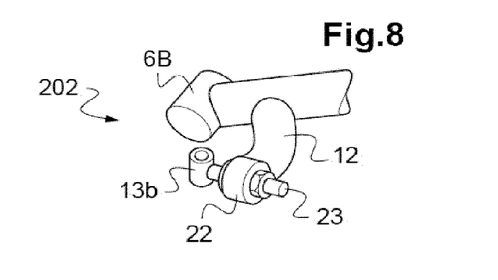
FIG. 8 is a perspective view of a fixing system for a connecting element according to another embodiment.

FIG. 8 depicts a fixing system 202 similar to that of FIG. 7, the threaded rod 23 bearing at its end one of the articulations 13b of the tie 13 of FIG. 3.

Figure 9:
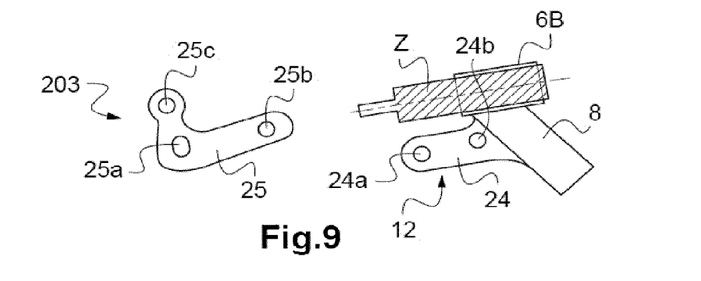
FIG. 9 is a view from above, of a fixing system for a connecting element according to another embodiment.

FIG. 9 depicts an embodiment similar to that described with reference to FIG. 6. Here, the fixing system 203 comprises a first fixing tab 24 pierced with two orifices 24a, 24b, forming part of the support element 12 and a second fixing tab 25, likewise pierced with two orifices 25a, 25b and a third orifice 25c forming an anchoring element and receiving one 13b of the articulations of the tie 13 depicted in FIG. 3. This second fixing tab forms the other part of the support element 12. The orifices 24a, 24b and, respectively 25a, 25b, align when the two fixing tabs 24 and 25 are superposed, allowing them to be assembled using screw/nut systems. Furthermore, one of the orifices 25a in the second plate 25 is of oblong shape allowing the position of this second tab to be adjusted relative to the first tab 24. Here again, the support element 12 is formed by the assembly of the two tabs 24, 25. The first fixing tab 24 is furthermore outside of the zone Z in which the second articulation 6B is mounted and/or in which the trailing arm is manufactured. In a variant, the second fixing tab 25 could comprise, by way of anchoring element, a bush 14a or a yoke 14c as described hereinabove.

The invention is not restricted to one particular embodiment of the fixing system, provided that it allows the connecting element 13, 14 to be mounted removably.

Furthermore, the various fixing systems described with reference to FIGS. 6 to 9 may be combined and installed without preference on one or both support elements of the rear suspension according to the invention. It will be noted moreover that the shape of the support elements and of the fixing elements described with reference to the figures and/or their relative positions or position relative to the support element, to the trailing arm or to the oblique arm may be modified according to the environment of the rear suspension and according to the shape of the trailing and oblique arms of the rear suspension.

Each trailing arm, and possibly the associated oblique arm, may be produced either as a rough casting, or by welding/fitting together various parts, or using box sections.

EXAMPLES

Examples 1 and 2 describe the handling dynamics of a rear suspension equipped with a tie 13 where the distance between the axes of rotation is 40 mm. The length of each trailing arm is 500 mm.

Examples 3 and 4 describe the impact, on the bounce dynamics and on the roll dynamics respectively, of a rear suspension equipped with an articulation 14 that is offset vertically by 15 mm. The length of each of the trailing arms is likewise 500 mm.

Example 1

Figure 10:
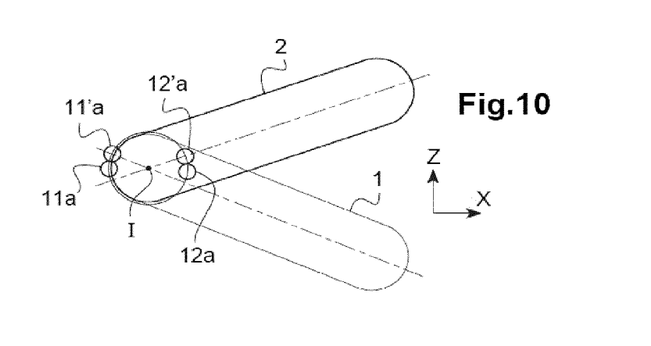
FIG. 10 is a schematic depiction, viewed in the transverse direction, of the roll dynamics of the articulations of the tie and of the arms of the rear suspension of FIG. 3.

FIG. 10 shows the behavior of this rear suspension in a situation of 5° (87.27 mrad) of roll, in which situation the right-hand trailing arm 2 pivots upward (toward the bump) by 7° and the left-hand trailing arm 1 pivots downwards (toward the bounce), again by 7° (in the figure, the circles referenced 11a, 12a denote the position of the free ends of the support elements in the absence of roll, whereas the circles referenced 11'a, 12'a denote this position with 5° of roll). In the absence of the tie 13, these rotations would cause the free ends of the support elements which act as anchor points for the tie 13 to move closer together by two times 0.15 mm (position 11'a, 12'a), with the result that each articulation of the tie 13, and therefore each second articulation 5B, 6B, would be forced longitudinally by 0.15 mm. This induces steering to the right (when cornering to the left or to the right) by 0.15/500=0.3 mrad for a trailing arm 500 mm in length, representing an increase in the induced understeer effect of 0.34% compared with the 5° of roll situation. Thus the presence of the tie 13 has practically no impact on the roll behavior of the rear suspension. It will be noted that the roll-steer effect is the same with roll to the left or to the right.

Example 2

Figure 11:
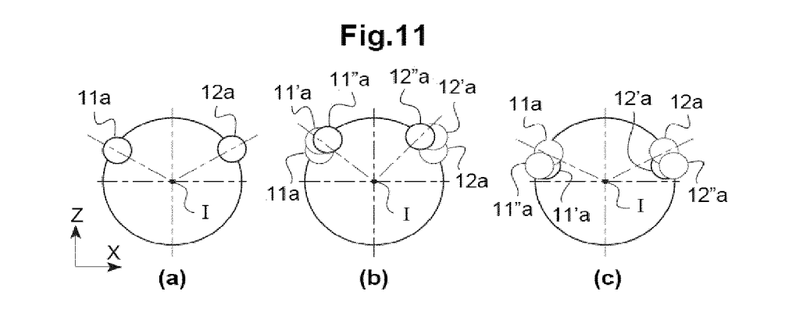
FIG. 11 is a schematic depiction, viewed in the transverse direction, of the roll dynamics of the articulations of the tie of the rear suspension of FIG. 3.

FIGS. 11 (a) to (c) show the impact of the presence of the tie on the roll dynamics when the tie is offset vertically by 15 mm above the point of intersection I of the axes of articulation of the trailing arms. In the figures, the circles symbolically represent the free ends 11a, 12a of the support elements which serve as anchor points for the tie, viewed along the transverse axis Y.

FIG. 11 (a) schematically depicts, in the form of circles, the free ends 11a, 12a in a situation of roll when traveling in a straight line, the second articulations being unconstrained. Because of the raised position of the second articulations, the angle formed between the straight line that passes through the point I and each end 11a, 12a and the horizontal is 36.9°.

FIG. 11 (b) shows a situation in which the vehicle has 5° (87.27 mrad) of roll, while cornering to the left. The arms pivot by 7.17° in opposite directions. With no tie present, the free ends of the support elements that serve as anchor points for the tie would move closer together by two times 2.00 mm (circles referenced 11"a and 12"a). They are held at a constant distance by the tie (circles referenced 11'a and 12'a) and constrain each second articulation by approximately 2 mm (depending on the local geometry) causing a trailing arm 500 mm long to rotate by 2/500=4 mrad, representing an increase in induced understeer effect of 4.6% compared with the 5° of roll situation.

FIG. 11 (c) shows a situation in which the vehicle has 5° of roll, while cornering to the right. The arms pivot by 7.17° in opposite directions. With no tie present, the free ends of the support elements that serve as anchor points for the tie (circles referenced 11"a and 12"a) would move apart by two times 1.7 mm. They are held at a constant distance by the tie (circles referenced 11'a and 12'a) and constrain each second articulation by approximately 1.7 mm (depending on the local geometry) causing a trailing arm 500 mm long to rotate by 1.7/500=3.4 mrad (11.7'), which constitutes 3.9% of the roll. In other words, in this situation, the induced understeer effect is increased by 3.9%.

This slightly asymmetric behavior of the two trailing arms is negligible, this configuration making it possible to gain a significant induced understeer effect (of 4.3% on average).

It will be noted that it is preferable to provide elastic articulations (second articulations) that have enough longitudinal radial travel about the central point so as not to place abnormal constraints on the suspension and so as to benefit from the desired effect.

Example 3

Figure 12:
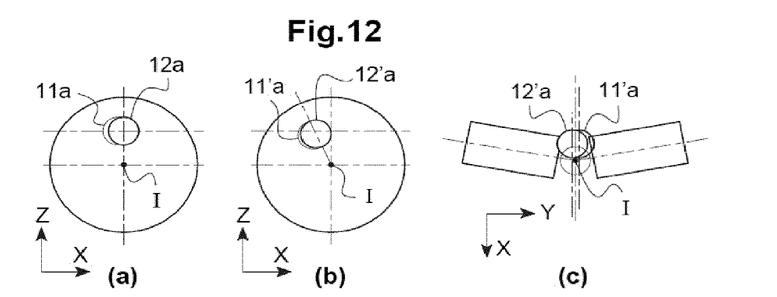
FIG. 12 is a schematic depiction, viewed in the transverse direction (diagrams (a) and (b)) or viewed from above (diagram (c)), of the bounce dynamics of the articulation of the rear suspension of FIG. 5.

FIGS. 12 (a) to (c) show the dynamic impact on bounce.

FIG. 12 (a) shows a situation in a straight line in which the articulation 14 is not preloaded and is situated 15 mm above the axis of rotation of the trailing arms. The circles referenced 11a, 12a correspond respectively to the free ends 11a, 12a.

FIG. 12 (b) depicts a bump/bounce situation (travel in Z of +100 mm) causing the arms to rotate by 10.5° in the same direction. FIG. 12 (c) is a view of this position, from above. The free end 12'a secured to the right-hand trailing arm is offset forward by 2.7 mm and offset to the left by 2.7 mm, forcing the central articulation by 2.7×sin 10°=0.48 mm (the angle of 10° being the angle between the axis of articulation A1 and the transverse axis Y). The free end 11'a secured to the left-hand trailing arm is offset forward by 2.7 mm and offset to the right by 2.7 mm, forcing the central articulation by 2.7×sin 10°=0.48 mm. Overall, the articulation is thus forced to deform laterally by 0.48+0.48 mm, namely by around 1 mm, which is acceptable.

Example 4

Figure 13:
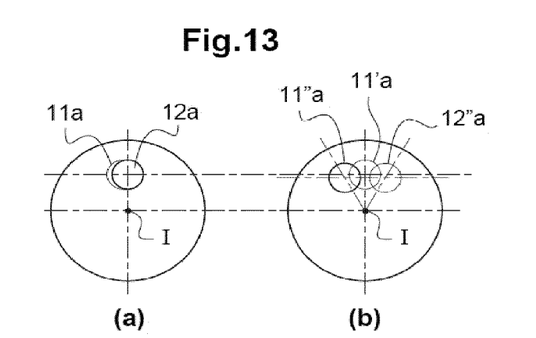
FIG. 13 is a schematic depiction, viewed in the transverse direction, of the roll dynamics of the articulations of the tie of the rear suspension of FIG. 5. In the present description, the terms front, rear, upper, lower, refer to the front and rear directions of the vehicle or of the rear suspension, when the latter is mounted on the vehicle, or in other words when the rear suspension is in a service position. The axes X, Y, Z, correspond respectively to the longitudinal (from front to rear) axis, the transverse axis and the vertical axis of the vehicle, when the latter is resting on the ground, or of the rear suspension in the service position. The vertical direction thus corresponds to the direction of gravity.

FIG. 13 (a) depicts a situation with roll in which the central articulation is unconstrained. The circles referenced 11a, 12a correspond respectively to the free ends 11a, 12a. FIG. 13 (b) shows a situation with 5° of roll (cornering to the left). The arms pivot by 7.17° in opposite directions. With no articulation present, the free ends of the support elements would move apart by two times 1.9 mm (circles referenced 11"a and 12"a). They are held at a zero distance by the articulation 14 (circle referenced 11'a) and constrain each second articulation by approximately 1.9 mm (depending on the local geometry) causing a trailing 10 arm 500 mm long to rotate by 1.9/500=3.8 mrad, representing an increase in induced understeer effect of 4.3% compared with the 5° of roll situation.

The invention claimed is:

1. A motor vehicle rear suspension comprising: two longitudinal trailing arms, wherein each trailing arm has a stub-axle carrier at one, rear, end and, at an opposite, front, end, a substantially transverse axis of rotation defined by a first articulation and a second articulation which are configured to be connected to a body of the vehicle, the second articulations being situated transversely between the first articulations, and the axes of rotation of the trailing arms intersecting at a point of intersection belonging to a transverse mid-plane of the rear suspension, the transverse mid-plane extending in the longitudinal and vertical directions, wherein: one of the trailing arms is secured, at its second articulation, to a first support element extending toward the front of the rear suspension, the other trailing arm is secured, at its second articulation, to a second support element extending toward the rear of the rear suspension, and free ends of the first and second support elements are situated in the longitudinal and vertical midplane of the rear suspension and are connected to one another and held at a fixed distance apart in a substantially longitudinal direction by a connecting element that is pivotably mounted about at least one transverse axis at least at one of the free ends of the first and second support elements.

2. The rear suspension as claimed in claim 1, wherein the fixed distance separating the free ends of the first and second support elements is comprised within an interval ranging from zero to a threshold value.

3. The rear suspension as claimed in claim 1, wherein the connecting element extends vertically above the point of intersection of the axes of rotation of the trailing arms at a non-zero distance less than or equal to a threshold value.

4. The rear suspension as claimed in claim 1, wherein the connecting element is an elongate component having two ends that are distant in the longitudinal direction, each of the ends being pivotably mounted at one of the free ends of the first and second support elements about at least one transverse axis of rotation.

5. The rear suspension as claimed in claim 4, wherein the ends of the elongate component are articulated to the free ends of the first and second support elements by articulations having at least one transverse axis of rotation.

6. The rear suspension as claimed in claim 1, wherein the connecting element is an articulation having at least one transverse axis of rotation.

7. The rear suspension as claimed in claim 6, wherein the connecting element is an elastic articulation.

8. The rear suspension as claimed in claim 1, further comprising a removable fixing system connects at least one support element to the connecting element.

9. The rear suspension as claimed in claim 8, wherein the fixing system is adjustable.

10. The rear suspension as claimed in claim 8, wherein the fixing system is adjustable in the longitudinal direction.

11. The rear suspension as claimed in claim 8, wherein the fixing system includes a first fixing element secured to a trailing arm near the second articulation thereof or a support element, second fixing element secured to an anchoring element of the connecting element, the first and second fixing elements each being pierced with two corresponding orifices accepting fixings of the screw-nut type.

12. The rear suspension as claimed in claim 11, wherein at least one of the orifices of the first or second fixing element has a larger dimension than the corresponding orifice of second or first fixing element.

13. The rear suspension as claimed in claim 11, wherein the larger dimension is in an adjustment direction.

14. The rear suspension as claimed in claim 8, wherein the fixing system includes a first fixing element secured to a trailing arm near the second articulation thereof or a support element, a second fixing element secured to an anchoring element of the connecting element, the first fixing element having a threaded orifice, the second fixing element having a threaded rod extending parallel to the longitudinal direction and engaging with the threaded orifice.

15. A motor vehicle comprising the rear suspension as claimed in claim 1.

\* \* \* \* \*